United States Patent
Chang et al.

(10) Patent No.: US 9,172,408 B2
(45) Date of Patent: Oct. 27, 2015

(54) TRANSMITTER SUPPORTING TWO MODES

(71) Applicant: MEDIATEK INC., Hsin-Chu (TW)

(72) Inventors: Hsiang-Hui Chang, Miaoli County (TW); Li-Shin Lai, Taipei (TW); Chih-Jung Chen, Hsinchu (TW); Chih-Hao Sun, New Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 11 days.

(21) Appl. No.: 14/037,329

(22) Filed: Sep. 25, 2013

(65) Prior Publication Data

US 2014/0086360 A1  Mar. 27, 2014

Related U.S. Application Data

(60) Provisional application No. 61/706,441, filed on Sep. 27, 2012.

(51) Int. Cl.
*H04B 1/04* (2006.01)
*H04L 27/04* (2006.01)

(52) U.S. Cl.
CPC ............ *H04B 1/0475* (2013.01); *H04B 1/0483* (2013.01); *H04L 27/04* (2013.01)

(58) Field of Classification Search
USPC ................................ 455/103, 114.2, 118, 323
See application file for complete search history.

(56) References Cited

U.S. PATENT DOCUMENTS

| | | | |
|---|---|---|---|
| 8,130,872 B2 * | 3/2012 | Brunn et al. | 375/316 |
| 8,428,544 B2 * | 4/2013 | Heck et al. | 455/323 |
| 8,750,818 B2 * | 6/2014 | Chung et al. | 455/305 |
| 2008/0175307 A1 | 7/2008 | Brunn | |

* cited by examiner

*Primary Examiner* — Blane J Jackson
(74) *Attorney, Agent, or Firm* — Winston Hsu; Scott Margo (57) ABSTRACT

A transmitter includes a first channel and a second channel. The first channel includes a first mixer, and is used for processing a first input signal to generate a first output signal; the second channel includes a second mixer, where the second channel does not receive any input signal. When the transmitter is operated under a first mode, both the first mixer and the second mixer receive oscillation signals.

16 Claims, 6 Drawing Sheets

TRANSMITTER SUPPORTING TWO MODES

CROSS REFERENCE TO RELATED APPLICATIONS

This application claims the priority of U.S. Provisional Application No. 61/706,441, filed on Sep. 27, 2012, which is included herein by reference in its entirety.

BACKGROUND

A signal quality of a transmitter is generally influenced by noise, and therefore the transmitter has to include a filter or other noise cancellation circuits to improve the signal quality. However, because the high quality filter or other noise cancellation circuits may increase the cost of the transmitter, how to provide a method to improve the signal quality without increasing the cost is an important topic.

SUMMARY

It is therefore an objective of the present invention to provide a transmitter having a first channel and a second channel, where the second channel can be used to filter an output signal of the first channel, therefore, the transmitter of the present invention can improve the signal quality.

According to one embodiment of the present invention, a transmitter comprises a first channel, a second channel and an output circuit. The first channel is utilized for processing a first input signal to generate a first output signal, wherein the first channel comprises a first mixer for outputting the first output signal by utilizing a first oscillation signal. The second channel comprises a second mixer, where the second mixer is arranged to receive a second oscillation signal, and the second mixer has an output node and an input node. The output circuit is coupled to the first channel and the output node of the second channel, and is utilized for receiving at least the first output signal. The second mixer does not receive any input signal via the input node of the second mixer, and when the transmitter is operated under a first mode, the first mixer receives the first oscillation signal and the second mixer receives the second oscillation signal.

According to another embodiment of the present invention, a transmitter comprises a plurality of first channels, an output circuit and a plurality of second mixers. The plurality of first channels is arranged for processing a plurality of input signals to generate a plurality of output signals, respectively, and the first channels comprises a plurality of first mixers respectively positioned in the first channels, and the first mixers are arranged for outputting the output signals by utilizing a plurality of first oscillation signals, respectively. The output circuit is coupled to the first channels, and is used for receiving the output signals. The plurality of second mixers are arranged to receive a plurality of second oscillation signals, respectively; and for each of the second mixers, an output node of the second mixer is coupled to the output circuit, and an input node of the second mixer does not receive any other input signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
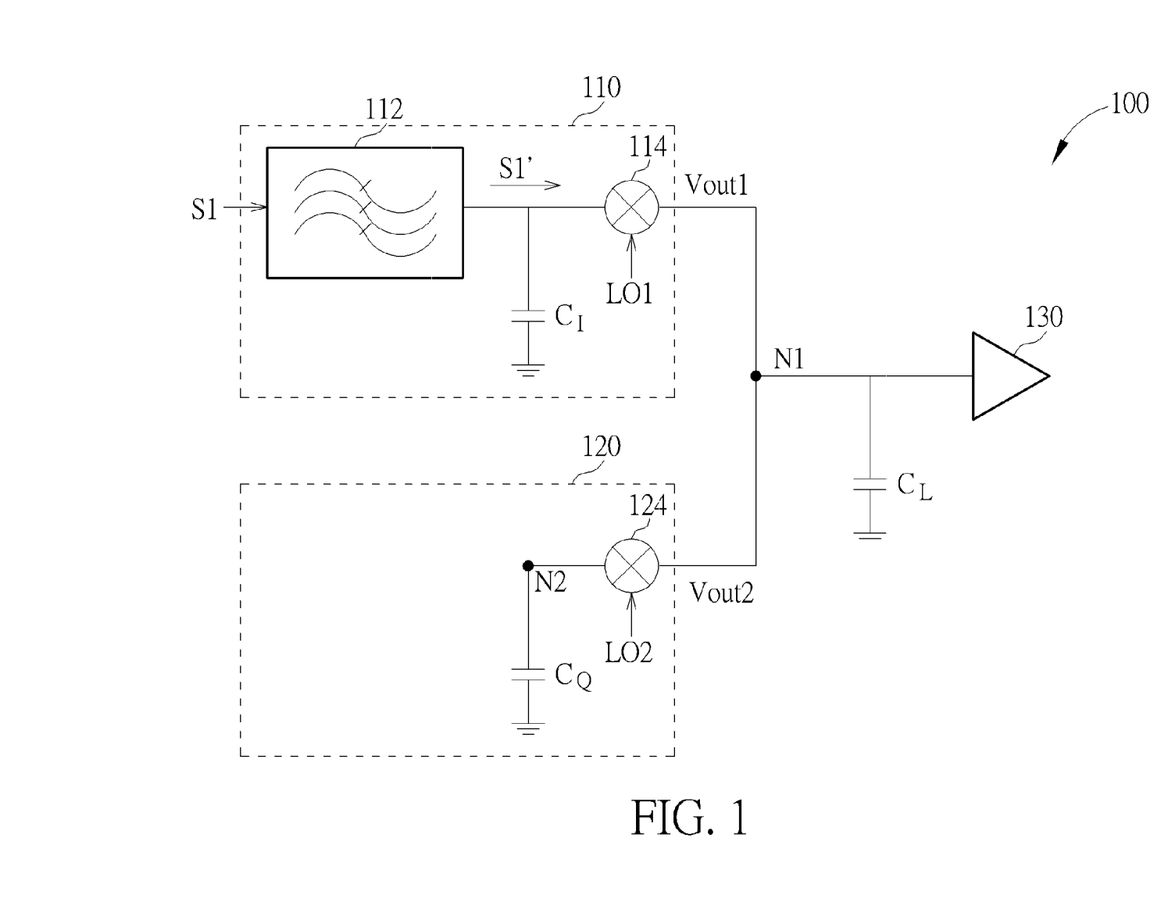
FIG. 1 is a diagram illustrating a transmitter according to a first embodiment of the present invention.

Please refer to FIG. 1, which is a diagram illustrating a transmitter 100 according to a first embodiment of the present invention. As shown in FIG. 1, the transmitter 100 comprises a first channel 110, a second channel 120, a capacitor CL and an output circuit 130, where the first channel 110 comprises a filter 112, a capacitor CI and a mixer 114, and the second channel 120 comprises a capacitor CQ and a mixer 124. In this embodiment, the mixers 114 and 124 can be implemented by voltage-mode passive mixers, and the filter 112 might be an active filter but not limited to.

One property of passive mixers 114 and 124 is that they are bi-directional and so tend to generate a time-varying interaction between their input and output impedances, this means that other capacitors (not shown) placed on the output of passive mixers 114 and 124 interact with the mixer to form an output low-pass filter which convolves in the frequency domain with oscillation signals LO1 or LO2 to form an input band-pass impedance response centered on or close to the switching frequency.

In one embodiment, the transmitter 100 can be used in 2G and/or 3G system, and might be operated as a polar transmitter. The first channel 110 is utilized for processing a first input signal S1 (e.g., the amplitude-modulated signal) to generate a first output signal Vout1, and the first mixer 114 for outputs the first output signal Vout1 by utilizing the first oscillation signal LO1 (e.g., the phase-modulated signal). The second mixer 124 is arranged to receive a second oscillation signal LO2, and the second mixer has an output node N1 and an input node N2. The output circuit 130 is utilized for receiving at least the first output signal Vout1. The second mixer 124 does not receive any input signal via the input node N2. More particularly, when the transmitter 100 is normally operating, the first mixer 114 receives the first oscillation signal LO1 for frequency up-conversion, and the second mixer 124 receives the second oscillation signal LO2 to serve as a filter to reduce the noise of the signal Vout1 at the node N1.

Figure 2:
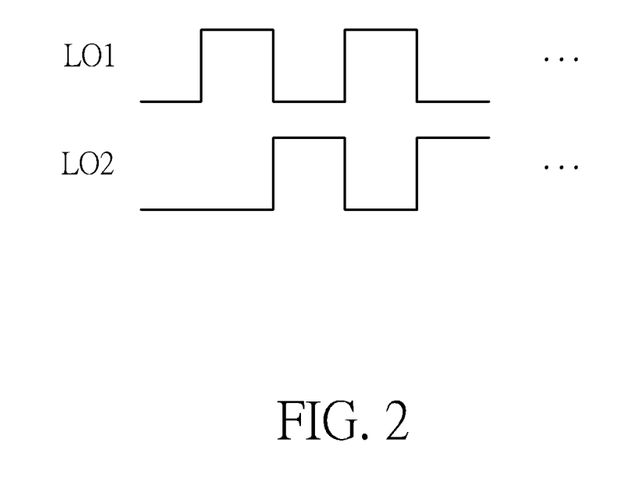
FIG. 2 is a timing diagram of the oscillation signals LO1-LO2 shown in FIG. 1.

In another embodiment, the transmitter 100 can be operated with two modes of different noise reduction levels. When the transmitter 100 is operated under a first mode, the first channel 110 receives and processes an input signal S1 to generate a first output signal Vout1 to the output circuit 130, where the non-overlapping oscillation signals LO1 and LO2 as shown in FIG. 2 are inputted into the mixers 114 and 124, respectively; and when the transmitter 100 is operated under a second mode, the first channel 110 receives and processes the input signal S1 to generate the first output signal Vout1 to the output circuit 130, but only the oscillation signal LO1 is inputted into the mixer 114, that is, the oscillation signal LO2 is not inputted into the mixer 124. By switching the two modes, the transmitter 100 is capable of enabling/disabling the noise reduction.

The details of the operations of the transmitter 100 are described as follows. When the transmitter 100 is operated under the first mode, in the first channel 110, the filter 112 receives the input signal S1 to generate a filtered input signal S1', and the mixer 114 mixes the filtered input signal S1' with the oscillation signal LO1 to generate the first output signal Vout1 to the output circuit 130. In the second channel 120, the mixer 124 receives the oscillation signal LO2 to serve as a filter to reduce the noise of the signal Vout at the node N1. The oscillation signals LO1 and LO2 are sequentially enabled (e.g., at the high voltage level), and their phases may shift by 180 degree. As shown in FIG. 2, the duty cycles of the oscillation signals LO1 and LO2 can be equal to or less than 50%, and the duty cycles of the oscillation signals LO1 and LO2 are substantially non-overlapping to each other (i.e. the enabling periods of the oscillation signals LO1 and LO2 are not overlapped)

Referring to FIG. 1 and FIG. 2, when the oscillation signal LO1 is enabled, the first channel 110 processes the input signal S1 to generate the first output signal Vout1; and later when the oscillation signal LO2 is enabled, part of the noise of the second output signal Vout2 (i.e., the first output signal Vout1) is transmitted to the node N2, that is the noise of the second output signal Vout2 is filtered by the mixer 124 and the capacitor CQ. In detail, during the oscillation signal LO1 is enabled:

$$Vout1=S1' \quad (1)$$

And during the oscillation signal LO2 is enabled, the summation of the charges on the nodes N1 and N2 is zero, that is:

$$C_Q(Vout2 \cdot Z^{-1} - Vout2) + C_L(Vout1 \cdot Z^{-1/2} - Vout2) = 0 \quad (2)$$

The transfer function between the Vout2 (i.e. Vout1) and S1' can be obtained by using the above-mentioned equations (1) and (2):

$$\frac{Vout2}{S1'} = \frac{Z^{-1/2}}{\frac{C_L}{C_Q}(1-Z^{-1})+1} = \frac{Z^{-1}}{\frac{C_L}{C_Q}(1-Z^{-2})+1} \quad (3)$$

On the other hand, when the transmitter 100 is operated under the second mode, the oscillation signal LO2 is not provided to the mixer 124. That is, the node N1 is not connected to the node N2 when the transmitter 100 is operated under the second mode.

In light of the above, when the transmitter 100 is operated under the first mode, the noise on the first output signal Vout1 can be filtered by using the circuits in the second channel 120, and the average noise can be reduced by 6 dB. Therefore, the signal quality of the transmitter 100 can be improved without using high cost filter or other noise cancellation circuit.

Figure 3:
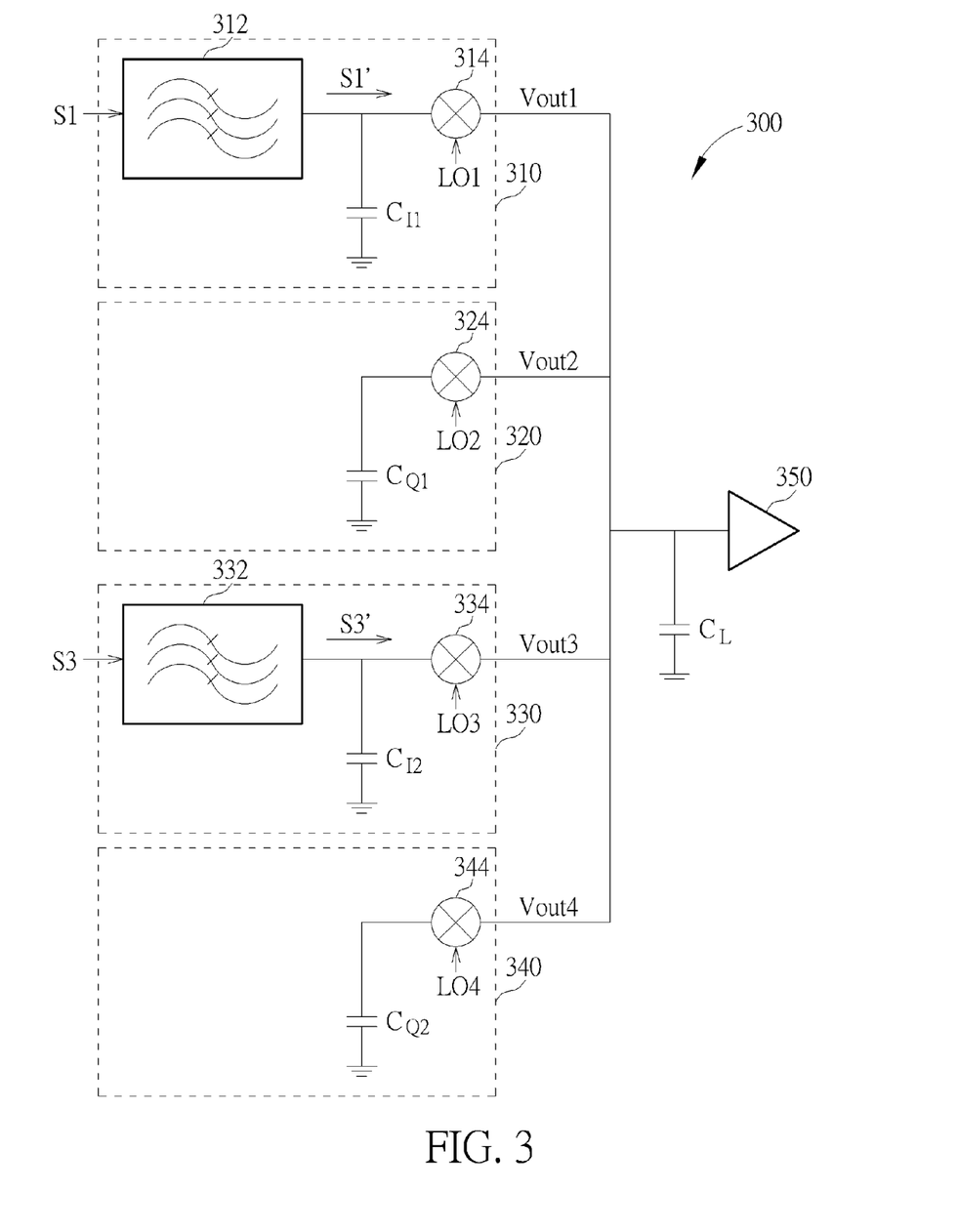
FIG. 3 is a diagram illustrating a transmitter according to a second embodiment of the present invention.

Please refer to FIG. 3, which is a diagram illustrating a transmitter 300 according to a second embodiment of the present invention. As shown in FIG. 3, the transmitter 300 comprises a channel 310, a channel 320, a channel 330, a channel 340, a capacitor CL and an output circuit 350, where the channel 310 comprises a filter 312, a capacitor CI1 and a mixer 314; the channel 320 comprises a capacitor CQ1 and a mixer 324; the channel 330 comprises a filter 332, a capacitor CI2 and a mixer 334; the channel 340 comprises a capacitor CQ2 and a mixer 344. In this embodiment, the mixers 314, 324, 334 and 344 can be implemented by voltage-mode passive mixers, and each of the filters 312 and 332 might be an active filter but not limited to.

One property of passive mixers 314, 324, 334 and 344 is that they are bi-directional and so tend to generate a time-varying interaction between their input and output impedances, this means that other capacitors (not shown) placed on the output of passive mixers 314, 324, 334 and 344 interact with the mixer to form an output low-pass filter which convolves in the frequency domain with oscillation signals LO1-LO4, respectively, to form an input band-pass impedance response centered on or close to the switching frequency.

Figure 4:
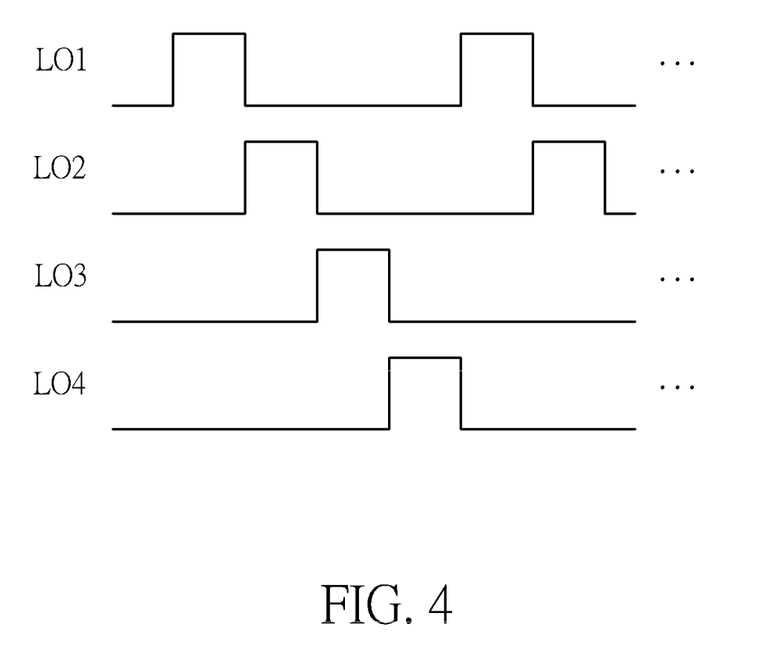
FIG. 4 is a timing diagram of the oscillation signals LO1-LO4 shown in FIG. 3.

The transmitter 300 can be operated as a polar transmitter, and similarly to the above embodiments, it can be operated with noise reduction or further providing two modes of different noise reduction levels. When the transmitter 300 is operated under a first mode, the channel 310 and the channel 330 receive and process input signals S1 and S3 to generate output signals Vout1 and Vout3, respectively, to the output circuit 350, where the oscillation signals LO1-LO4 shown in FIG. 4 are inputted into the mixers 314 to 324, respectively. The first input signal S1 and the third input signal S3 are a pair of differential signals. The oscillation signals LO1, LO2, LO3 and LO4 are sequentially enabled (e.g., at the high voltage level), and the duty cycles of the oscillation signals LO1, LO2, LO3 and LO4 are all about equal to or less than 25% (the enabling periods of the oscillation signals LO1, LO2, LO3 and LO4 are not overlapped to one another) as shown in FIG. 4.

When the transmitter 300 is operated under a second mode, the channel 310 and the channel 330 receive and process the input signals S1 and S3 (e.g., the amplitude-modulated signals) to generate the output signals Vout1 and Vout3, respectively, to the output circuit 350, but only the oscillation signals LO1 and LO3 (e.g., the phase-modulated signals) are inputted into the mixer 314 and 334, respectively. That is, the oscillation signals LO2 and LO4 are not inputted into the mixer 324 and 334. The details of the operations of the transmitter 300 are similar to the above embodiments in FIG. 1, so the description is omitted for clarity.

Figure 5:
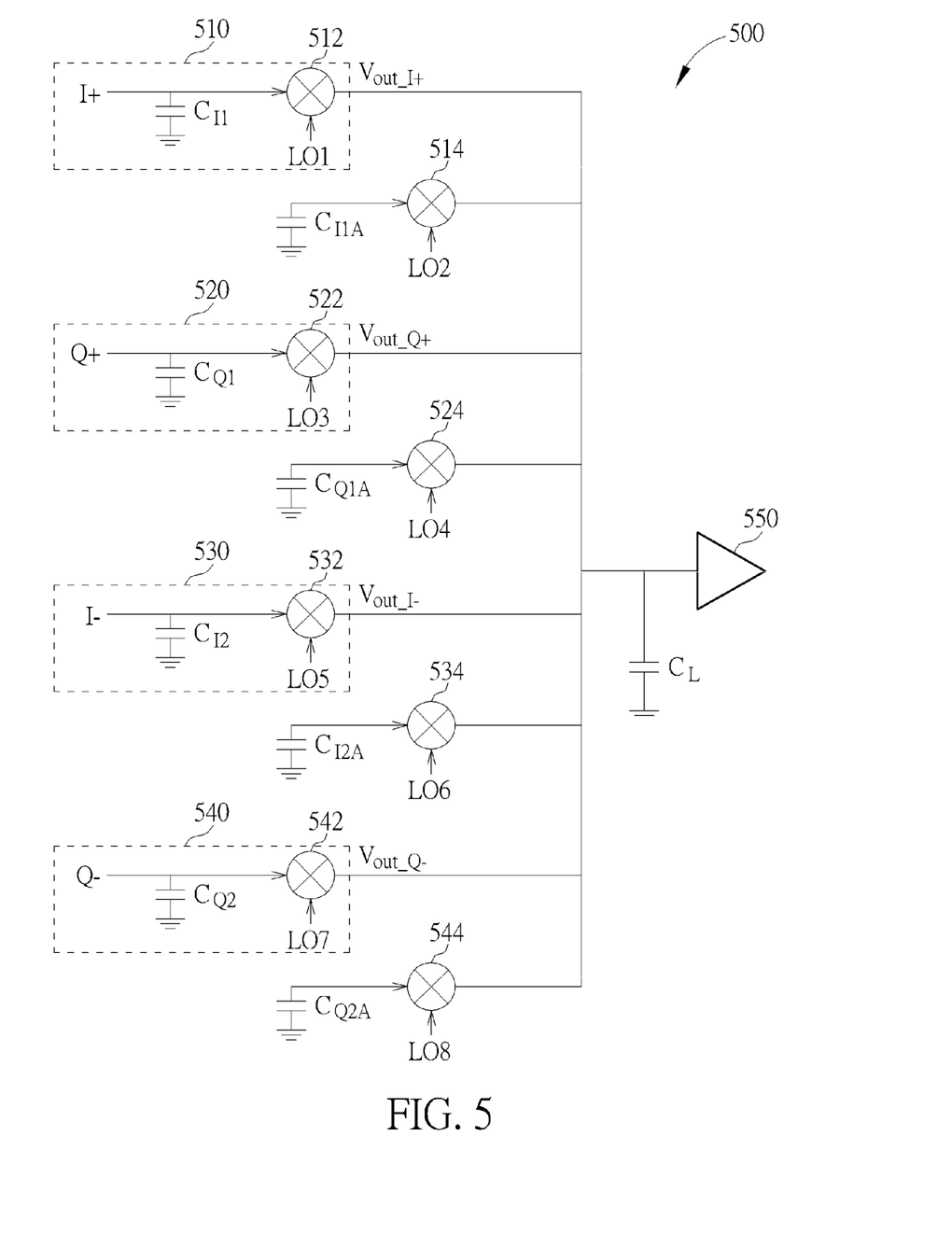
FIG. 5 is a diagram illustrating a transmitter according to a third embodiment of the present invention.
Figure 6:
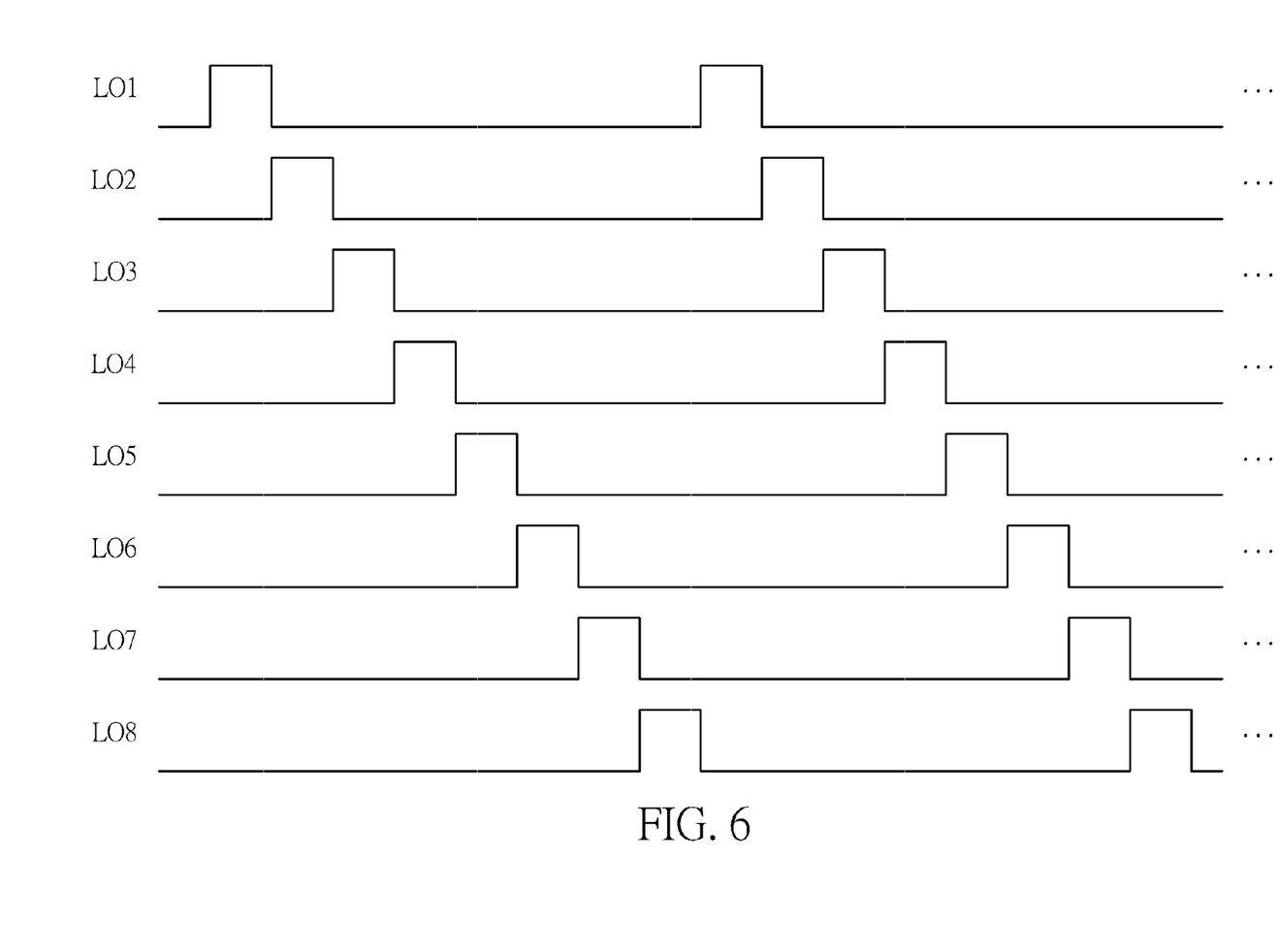
FIG. 6 is a timing diagram of the oscillation signals LO1-LO8 shown in FIG. 5.

In the following embodiment, the signal quality of the transmitter can also be improved when the transmitter is a direct conversion transmitter (DCT) transmitter. Please refer to FIG. 5, which is a diagram illustrating a transmitter 500 according to a third embodiment of the present invention. As shown in FIG. 5, the transmitter 500 comprises a first in-phase channel 510, a first quadrature channel 520, a second in-phase channel 530, a second quadrature channel 540, for mixers 514, 524, 534 and 544, five capacitors CI1A, CQ1A, CI2A, CQ2A and CL and an output circuit 550, where the first in-phase channel 510 comprises a capacitor CI1 and a mixer 512; the first quadrature channel 520 comprises a capacitor CQ1 and a mixer 522; the second in-phase channel 530 comprises a capacitor CI2 and a mixer 532; the second quadrature channel 540 comprises a capacitor CQ2 and a mixer 542. In this embodiment, the eight mixers shown in FIG. 5 can be implemented by voltage-mode passive mixers. FIG. 6 shows a timing diagram of the oscillation signals LO1-LO8, and the duty cycles of the oscillation signals LO1-LO8 are about 12.5% or less than 12.5%, and the duty cycles of the oscillation signals LO1-LO8 are substantially non-overlapping to each other (i.e. the enabling periods of any two of the oscillation signals LO1-LO8 are not overlapped).

In the operations of the transmitter 500, the oscillation signals LO1-LO8 are sequentially enabled, and the first in-phase channel 510, the first quadrature channel 520, the second in-phase channel 530 and the second quadrature channel 540 receive and process a first in-phase input signal I+, a first quadrature input signal Q+, a second in-phase input signal I−, a second quadrature input signal Q− to generate a first in-phase output signal Vout_I+, a first quadrature output signal Vout_Q+, a second in-phase output signal Vout_I−, a second quadrature output signal Vout_Q−, respectively, to the output circuit 550. The first in-phase input signal I+ and the second in-phase input signal I− are a differential pair, and the first quadrature input signal Q+ and the second quadrature output signal Vout_Q− are a differential pair.

Similar to the above embodiments, the noise of the first in-phase output signal Vout_I+ can be filtered by the mixer 514 and capacitor CI1A after the oscillation signal LO2 is enabled, the noise of the first quadrature output signal Vout_Q+ can be filtered by the mixer 524 and capacitor CQ1A after the oscillation signal LO4 is enabled, the noise of the second in-phase output signal Vout_I− can be filtered by the mixer 534 and capacitor CI2A after the oscillation signal LO6 is enabled, and the noise of the second quadrature output signal Vout_Q− can be filtered by the mixer 544 and capacitor CQ2A after the oscillation signal LO8 is enabled. Therefore, the signal quality of the transmitter 500 can be improved.

Briefly summarized, in the transmitter of the embodiments, circuits in the second channel can be used to filter an output signal of the first channel, and therefore the transmitter can improve the signal quality without too much cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter, comprising:
   a first channel, for processing a first input signal to generate a first output signal,
     wherein the first channel comprises:
     a first filter, for filtering the first input signal to generate a filtered first input signal;
     a first mixer, coupled to the first filter, for receiving the filtered first input signal and outputting the first output signal by utilizing a first oscillation signal;
     a first capacitor, wherein a node of the first capacitor is coupled between the first filter and the first mixer, and another node of the first capacitor is coupled to a ground;
   a second channel, comprising:
     a second mixer, wherein the second mixer is arranged to receive a second oscillation signal, and the second mixer has an output node and an input node; and
     a second capacitor, wherein a node of the second capacitor is coupled to the input node of the second mixer, and another node of the second capacitor is coupled to the ground; and
   an output circuit, coupled to the first channel and the output node of the second channel, for receiving at least the first output signal;
   wherein the second mixer does not receive any input signal via the input node of the second mixer, and when the transmitter is operated under a first mode, the first mixer receives the first oscillation signal and the second mixer receives the second oscillation signal.

2. The transmitter of claim 1, wherein when the transmitter is operated under a second mode, the first mixer receives the first oscillation signal and the second mixer does not receive the second oscillation signal.

3. The transmitter of claim 1, wherein the first filter is an active filter.

4. The transmitted of claim 1, wherein each of the first mixer and the second mixer is a bi-directional passive mixer.

5. A transmitter, comprising:
   a first channel, for processing a first input signal to generate a first output signal,
     wherein the first channel comprises:
     a first mixer, for outputting the first output signal by utilizing a first oscillation signal;
   a second channel, comprising:
     a second mixer, wherein the second mixer is arranged to receive a second oscillation signal, and the second mixer has an output node and an input node; and
   a third channel, coupled to the output circuit, for processing a second input signal to generate a second output signal to the output circuit, wherein the first input signal and the second input signal is a differential pair, and the third channel comprises:
     a third mixer, for outputting the second output signal by utilizing a third oscillation signal; and
   a fourth channel, coupled to the output circuit, comprising:
     a fourth mixer, wherein the fourth mixer is arranged to receive a fourth oscillation signal, and the fourth mixer has an output node and an input node; and
   an output circuit, coupled to the first channel and the output node of the second channel, for receiving at least the first output signal;
   wherein the second mixer does not receive any input signal via the input node of the second mixer, and when the transmitter is operated under a first mode, the first mixer receives the first oscillation signal and the second mixer receives the second oscillation signal;
   wherein the fourth mixer does not receive any input signal via the input node of the fourth mixer, and when the transmitter is operated under the first mode, the third mixer receives the third oscillation signal and the fourth mixer receives the fourth oscillation signal.

6. The transmitter of claim 5, wherein duty cycles of the first oscillation signal, the second oscillation signal, the third oscillation signal and the fourth oscillation signal are about equal to or less than 25%.

7. The transmitter of claim 5, wherein the first input signal and the second input signal are a pair of differential signals.

8. The transmitter of claim 1, wherein the transmitter is a polar transmitter in which the first input signal is an amplitude-modulated signal and the first oscillation signal is a phase-modulated signal.

9. The transmitter of claim 1, wherein the second mixer is arranged to selectively receive the second oscillation signal by different modes.

10. A transmitter, comprising:
    a first channel, for processing a first input signal to generate a first output signal,
      wherein the first channel comprises:
      a first mixer, for outputting the first output signal by utilizing a first oscillation signal;
    a second channel, comprising:
      a second mixer, wherein the second mixer is arranged to receive a second oscillation signal, and the second mixer has an output node and an input node; and an output circuit, coupled to the first channel and the output node of the second channel, for receiving at least the first output signal;

wherein the second mixer does not receive any input signal via the input node of the second mixer, and when the transmitter is operated under a first mode, the first mixer receives the first oscillation signal and the second mixer receives the second oscillation signal; and the first oscillation signal and the second oscillation signal are non-overlapping with each other.

11. A transmitter, comprising:
a plurality of first channels, for processing a plurality of input signals to generate a plurality of output signals, respectively, wherein the first channels comprises:
   a plurality of first mixers respectively positioned in the first channels, for outputting the output signals by utilizing a plurality of first oscillation signals, respectively; and
an output circuit, coupled to the first channels, for receiving the output signals; and
a plurality of second mixers, wherein the second mixers are arranged to receive a plurality of second oscillation signals, respectively; and for each of the second mixers, an output node of the second mixer is coupled to the output circuit, and a input node of the second mixer does not receive any other input signal.

12. The transmitted of claim 11, wherein the first channels comprises a first in-phase channel, a first quadrature channel, a second in-phase channel and a second quadrature channel.

13. The transmitter of claim 11, wherein duty cycles of the first oscillation signals and the second oscillation signals are substantially non-overlapping to each other.

14. The transmitted of claim 11, wherein each of the first mixers and the second mixers is a bi-directional passive mixer.

15. The transmitter of claim 11, wherein the transmitter is a direct conversion transmitter in which the input signals comprises in-phase signals and quadrature signals.

16. The transmitter of claim 11, wherein the second mixers are arranged to selectively receive the second oscillation signal by different modes.

* * * * *